US 8,918,528 B2

(12) United States Patent
Gao et al.

(10) Patent No.: US 8,918,528 B2
(45) Date of Patent: Dec. 23, 2014

(54) OPERATING GROUP RESOURCES IN SUB-GROUPS AND NESTED GROUPS

(71) Applicant: Huawei Technologies Co., Ltd., Shenzhen, Guangdong (CN)

(72) Inventors: Ying Gao, Nanjing (CN); Lei Jin, Nanjing (CN); Yongjing Zhang, Nanjing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 14/145,844

(22) Filed: Dec. 31, 2013

(65) Prior Publication Data

US 2014/0115169 A1    Apr. 24, 2014

Related U.S. Application Data

(63) Continuation of application No. PCT/CN2012/078742, filed on Jul. 17, 2012.

(30) Foreign Application Priority Data

Feb. 29, 2012    (CN) .......................... 2012 1 0050131

(51) Int. Cl.
| | | |
|---|---|---|
| *G06F 15/16* | (2006.01) | |
| *H04L 29/06* | (2006.01) | |
| *H04W 72/00* | (2009.01) | |
| *H04L 12/24* | (2006.01) | |
| *H04L 29/08* | (2006.01) | |
| *H04W 4/00* | (2009.01) | |
| *G06Q 10/06* | (2012.01) | |

(52) U.S. Cl.
CPC ............. *H04L 63/10* (2013.01); *H04W 72/00* (2013.01); *H04L 41/0893* (2013.01); *H04L 63/104* (2013.01); *H04L 67/1014* (2013.01); *H04W 4/005* (2013.01); *H04L 29/08* (2013.01); *G06Q 10/06* (2013.01)
USPC ........... 709/229; 709/203; 709/217; 709/223; 709/226

(58) Field of Classification Search
CPC ....... H04W 8/24; H04W 8/005; H04W 72/00; H04W 72/04; H04L 41/08; H04L 41/0893; H04L 41/14; H04L 63/10; H04L 63/104
USPC ................. 709/203, 206, 217, 223, 226, 229; 455/410, 458
See application file for complete search history.

(56) References Cited

U.S. PATENT DOCUMENTS

| | | | |
|---|---|---|---|
| 6,603,740 B1 | 8/2003 | Du | |
| 6,839,752 B1 * | 1/2005 | Miller et al. | .................. 709/223 |

(Continued)

FOREIGN PATENT DOCUMENTS

| | | |
|---|---|---|
| CN | 101083537 A | 12/2007 |
| CN | 102130773 A | 7/2011 |

(Continued)

OTHER PUBLICATIONS

ETSI: Machine-to-Machine communications (M2M); Functional architecture, ETSI TS 102 690 V1.1.1,dated Oct. 2011, total 280 pages.

(Continued)

*Primary Examiner* — Ramy M Osman

(74) *Attorney, Agent, or Firm* — Huawei Tecnologies Co., Ltd

(57) ABSTRACT

The present invention provides a method, a group server, and an apparatus for operating a group resource; a member resource operation request sent to a member device carries an operation request identifier, so that the member device that the member resource belongs to determines, according to the operation request identifier, whether operation request identifiers stored by the member device include the operation request identifier, and processes the member resource operation request according to a determination result. Therefore, repeated processing or cyclic processing of the member resource operation request may be avoided.

13 Claims, 7 Drawing Sheets

(56) References Cited

U.S. PATENT DOCUMENTS

| | | | |
|---|---|---|---|
| 7,856,448 B2 * | 12/2010 | Sheehan | 707/783 |
| 8,341,402 B2 * | 12/2012 | Han et al. | 713/163 |
| 8,559,610 B2 * | 10/2013 | Crockett et al. | 379/202.01 |
| 8,798,579 B2 * | 8/2014 | Hickie | 455/410 |
| 2008/0307054 A1 * | 12/2008 | Kamarthy et al. | 709/206 |
| 2011/0252235 A1 | 10/2011 | Dolan et al. | |
| 2011/0268047 A1 * | 11/2011 | Nath et al. | 370/329 |
| 2011/0276640 A1 * | 11/2011 | Jesse et al. | 709/206 |
| 2012/0296968 A1 * | 11/2012 | Lin et al. | 709/204 |
| 2013/0029641 A1 * | 1/2013 | Hickie | 455/410 |
| 2013/0070710 A1 | 3/2013 | Guo | |
| 2013/0252643 A1 * | 9/2013 | Park et al. | 455/458 |
| 2013/0310016 A1 * | 11/2013 | Park et al. | 455/418 |

FOREIGN PATENT DOCUMENTS

| | | |
|---|---|---|
| CN | 102136933 A | 7/2011 |
| CN | 102244855 A | 11/2011 |
| EP | 2523528 A1 | 11/2012 |
| EP | 2547040 A1 | 1/2013 |
| WO | 2009002236 A1 | 12/2008 |
| WO | 2011137788 A1 | 11/2011 |
| WO | 2011140975 A1 | 11/2011 |

OTHER PUBLICATIONS

ETSI:"Machine-to-Machine communications (M2M); mIa, dIa and mId interfaces", Draft ETSI TS 102.921V<0.9.4>, dated Nov. 2011, clean version, total 344 pages.

ETSI:Machine-to-Machine communications (M2M); Functional architecture, ETSI TS 102 690 V1.1.2,dated Dec. 2011, clean version, total 283 pages.

ETSI:Machine-to-Machine communications (M2M); Functional architecture, ETSI TS 102 690 V1.1.2,dated Dec. 2011 with marks, total 285 pages.

Telefon AB LM Ericsson:"TS 102 921 v094", ETSI M2M(11)0904r1, dated Dec. 2, 2011, total 1 pages.

ETSI:"Annex A (normative) General mapping of primitives", draft TS 102 921v094, dated Nov. 2011, clean version, total 3 pages.

ETSI:"Annex B (normative) Method and Resources XSD formal definition", draft TS 102 921v094, dated Nov. 2011,clean version,total 4 pages.

ETSI:"Annex C (normative) HTTP binding for M2M REST resources", draft TS 102 921v094, dated Nov. 2011, clean version,total 11 pages.

ETSI:"Annex D (normative) CoAP Binding for M2M Rest Resources", draft TS 102 921v094, dated Nov. 2011, clean version,total 10 pages.

ETSI:"Annex E (normative) Mapping of Management Objects", draft TS 102 921v094, dated Nov. 2011,clean version, total 16 pages.

ETSI:"Annex F (normative) Interworking with XDMS", draft TS 102 921v094,dated Nov. 2011, clean version,total 154 pages.

ETSI:"Annex G (normative) Start-up and configuration operations", draft TS 102 921v094, dated Nov. 2011, clean version,total 1 pages.

ETSI:"Annex H (informative) Securing CoAP-based mId Using Object Security", draft TS 102 921v094,dated Nov. 2011,clean version, total 1 pages.

ETSI:"Annex I (informative) Security Credential and Method Combinations", draft TS 102 921v094, dated Nov. 2011,clean version,total 1 pages.

\* cited by examiner

OPERATING GROUP RESOURCES IN SUB-GROUPS AND NESTED GROUPS

CROSS-REFERENCE TO RELATED APPLICATIONS

This application is a continuation of International Application No. PCT/CN2012/078742, filed on Jul. 17, 2012, which claims priority to Chinese Patent Application No. 201210050131.1, filed on Feb. 29, 2012, both of which are hereby incorporated by reference in their entireties.

FIELD OF THE INVENTION

The present invention relates to the field of machine-to-machine communications (Machine-to-Machine Communications, M2M) technologies, and in particular, to management of group resources in sub-groups and nested groups.

BACKGROUND OF THE INVENTION

Machine-to-machine communications (Machine-to-Machine Communications, M2M) is a network-based application and service focusing on intelligent machine-to-machine interaction. The M2M technology embeds a wireless or wired communication module and an application processing logic into a machine to implement data communication without manual intervention, so as to satisfy information requirements of a user in various aspects such as monitoring, commanding and scheduling, data collection, and measurement. In an M2M architecture in the prior art, a communication method oriented to a group resource is described. In this method, an M2M application, an M2M platform, an M2M terminal, an M2M gateway, and each application or a first data object running on the M2M terminal and M2M gateway are all regarded as a representational state transfer (REpresentational State Transfer) style of RESTful resources; a universal resource identifier (Universal Resource Identifier, URI) is used to identify an application or a data object; and various group resources are created to perform a group operation for the above multiple resources.

In some common M2M services, a user may create a group to simultaneously perform same operations for member resources such as the M2M terminal or gateway included in the group resource. It is understandable that the created group resource is also a resource, and that the group resource includes resources of the group resource itself and member resources included in the group resource. The resources of the group resource itself may be an identifier of the group resource, a group server that the group resource belongs to, a state (for example, whether it is a stateful group resource), and so on. Further, the member resources included in the group resource may be a list of member resources, and may also be a mapping of member resource related information in the group resource. The member resources in the M2M group resource may belong to a local group server, or may also belong to a remote group server. However, in some cases, either of two group resources may be a member resource of the other group resource. For example, in an intelligent safeguard system, a regional police station can set monitoring groups in neighboring communities to be mutually inclusive, and when an alarm occurs, mutual aid may be provided according to the actual condition. For another example, in a future smart home system, a user may perform group management for electrical appliances (such as a lamp, a door and a window, and metering) at home or on behalf of another family member. Consider a specific example when children consider that parents are old; and therefore, a group of electrical appliances at the home of the parents may be nested to help the parents to perform management. In such case, for example, the system may help to close the windows when it rains, confirm closure of doors and windows at night, and turn off all electrical appliances. Similarly, in an instance where the parents consider that the children are busy on work and always on business trips, and a group of electrical appliances at the home of the children may also be nested to help the children to take care of the family. In another case, a same member resource may be included by two group resources.

In the above cases, when group resources are mutually inclusive, an error indicating that an operation request sent to a group resource is sent cyclically between the mutually inclusive group resources may be caused, and when a same member resource is included by at least two group resources, an error indicating that an operation request directed to the at least two group resources is executed repeatedly may be caused.

SUMMARY OF THE INVENTION

The method, group server, and apparatus for operating a group resource according to embodiments of the present invention can avoid repeated processing or cyclic processing of an operation request directed to a member resource.

In one aspect, the present invention provides a method for operating a group resource, including: receiving an operation request directed to a member resource; generating a first operation request identifier for the operation request directed to the member resource; and sending a first member resource operation request to a member device that the member resource belongs to, where the first member resource operation request includes the first operation request identifier, so that the member device that the member resource belongs to determines, according to the first operation request identifier, whether operation request identifiers stored by the member device include the first operation request identifier, and processes the first member resource operation request according to a determination result.

Optionally, the operation request directed to the member resource carries a group resource identifier of a group resource that the member resource belongs to; and before the generating a first operation request identifier for the operation request directed to the member resource, the method further includes: determining, according to the group resource identifier, that the first operation request identifier for the operation request directed to the member resource needs to be generated.

Optionally, the determining, according to the group resource identifier, that the first operation request identifier for the operation request directed to the member resource needs to be generated includes: determining, according to the group resource identifier, that the group resource identified by the group resource identifier includes a sub-group resource that is used as a member resource; and determining that the first operation request identifier for the operation request directed to the member resource needs to be generated.

Optionally, the determining, according to the group resource identifier, that the first operation request identifier for the operation request directed to the member resource needs to be generated includes: determining, according to the group resource identifier, that a sub-group resource included in the group resource identified by the group resource identifier is a remote group resource, or determining, according to the group resource identifier, that a member resource included in the group resource identified by the group resource identifier includes the group resource identified by the group resource identifier; and determining that the first operation request identifier for the operation request directed to the member resource needs to be generated.

Optionally, before the generating a first operation request identifier for the operation request directed to the member resource, the method further includes: determining that the operation request directed to the member resource is an update request.

Optionally, the method further includes: receiving a second member resource operation request, where the second member resource operation request includes a second operation request identifier; determining that a stored list of operation request identifiers includes the second operation request identifier, and returning an error response to a sender of the second member resource operation request, or determining that the stored list of operation request identifiers does not include the second operation request identifier, storing the second operation request identifier, and performing the operation indicated in the second member resource operation request; or the method further includes: receiving a second member resource operation request, where the second member resource operation request includes a second operation request identifier and a sub-group resource identifier; and when determining that the stored list of operation request identifiers includes the second operation request identifier, returning an error response to the sender of the second member resource operation request, or when determining that the stored list of operation request identifiers does not include the second operation request identifier, sending a third member resource operation request to a member device that a member resource included in the sub-group resource identified by the sub-group resource identifier belongs to.

In another aspect, the present invention provides a method for operating a group resource, including:

receiving a second member resource operation request; determining that the second member resource operation request carries a second operation request identifier; and determining whether a stored list of operation request identifiers includes the second operation request identifier, and processing the second member resource operation request according to a determination result.

Optionally, when the second member resource operation request further carries a sub-group resource identifier, the processing the second member resource operation request according to a determination result includes: when determining that the stored list of operation request identifiers includes the second operation request identifier, returning an error response to a sender of the second member resource operation request; or when determining that the stored list of operation request identifiers does not include the second operation request identifier, sending a third member resource operation request to a member device that a member resource included in a sub-group resource identified by the sub-group resource identifier belongs to; or, when the second member resource operation request does not carry a sub-group resource identifier, the processing the second member resource operation request according to a determination result includes: when determining that the stored list of operation request identifiers includes the second operation request identifier, returning an error response to the sender of the second member resource operation request, or when determining that the stored list of operation request identifiers does not include the second operation request identifier, storing the second operation request identifier, and performing an operation indicated in the second member resource operation request.

Optionally, the method further includes: receiving an operation request directed to a member resource; generating a first operation request identifier for the operation request directed to the member resource; and sending a first member resource operation request to a member device that the member resource belongs to, where the first member resource operation request includes the first operation request identifier, so that the member device that the member resource belongs to determines, according to the first operation request identifier, whether operation request identifiers stored by the member device include the first operation request identifier, and processes the member resource operation request according to a determination result.

Optionally, the operation request directed to the member resource carries a group resource identifier of a group resource that the member resource belongs to; and before the generating a first operation request identifier for the operation request directed to the member resource, the method further includes: determining, according to the group resource identifier, that the first operation request identifier for the operation request directed to the member resource needs to be generated.

Optionally, the determining, according to the group resource identifier, that the first operation request identifier for the operation request directed to the member resource needs to be generated includes: determining, according to the group resource identifier, that the group resource identified by the group resource identifier includes a sub-group resource that is used as a member resource; and determining that the first operation request identifier for the operation request directed to the member resource needs to be generated.

Optionally, the determining, according to the group resource identifier, that the first operation request identifier for the operation request directed to the member resource needs to be generated includes: determining, according to the group resource identifier, that a sub-group resource included in the group resource identified by the group resource identifier is a remote group resource, or determining, according to the sub-group resource identifier, that a member resource included in the sub-group resource identified by the sub-group resource identifier includes the group resource identified by the group resource identifier; and determining that the first operation request identifier for the operation request directed to member resource needs to be generated.

Optionally, before the generating the operation request identifier for the operation request directed to the member resource, the method further includes: determining that the member resource operation request is an update request.

In another aspect, the present invention provides a group server, including: a receiving module, configured to receive an operation request directed to a member resource; a generating module, configured to generate a first operation request identifier for the operation request directed to the member resource; and a sending module, configured to send a first member resource operation request to a member device that the member resource belongs to, where the first member resource operation request includes the first operation request identifier, so that the member device that the member resource belongs to determines, according to the first operation request identifier, whether operation request identifiers stored by the member device include the first operation request identifier, and processes the first member resource operation request according to a determination result.

Optionally, the operation request directed to the member resource carries a group resource identifier of a group resource that the member resource belongs to; and the group server further includes: a determining module, configured to determine, according to the group resource identifier, that the first operation request identifier for the operation request directed to the member resource needs to be generated.

Optionally, the determining module is specifically configured to: determine, according to the group resource identifier, that the group resource identified by the group resource identifier includes a sub-group resource that is used as a member resource; and determine that the first operation request identifier for the operation request directed to the member resource needs to be generated; or the determining module is specifically configured to: determine, according to the group resource identifier, that a sub-group resource included in the group resource identified by the group resource identifier is a remote group resource, or determine, according to the group resource identifier, that a member resource included in the group resource identified by the group resource identifier includes the group resource identified by the group resource identifier; and determine that the first operation request identifier for the operation request directed to the member resource needs to be generated.

Optionally, the group server further includes: an operation request determining module, configured to determine that the operation request directed to the member resource is an update request.

Optionally, the receiving module is further configured to receive a second member resource operation request, where the second member resource operation request includes a second operation request identifier; and the group server further includes a judging module, configured to determine that a stored list of operation request identifiers includes the second operation request identifier, and return an error response to a sender of the second member resource operation request; or configured to determine that the stored list of operation request identifiers does not include the second operation request identifier, store the second operation request identifier, and perform an operation indicated in the second member resource operation request; or the receiving module is further configured to receive a second member resource operation request, where the second member resource operation request includes a second operation request identifier and a sub-group resource identifier; and the group server further includes a judging module, configured to determine that the stored list of operation request identifiers includes the second operation request identifier, and return an error response to the sender of the second member resource operation request; or configured to determine that the stored list of operation request identifiers does not include the second operation request identifier, and send a third member resource operation request to a member device that a member resource included in a sub-group resource identified by the sub-group resource identifier belongs to.

In still another aspect, the present invention provides an apparatus for operating a group resource, including: a receiving module, configured to receive a second member resource operation request; a determining module, configured to determine that the member resource operation request carries a second operation request identifier; and a judging module, configured to determine whether a stored list of operation request identifiers includes the operation request identifier, and process the second member resource operation request according to a determination result.

Optionally, when the second member resource operation request further carries a sub-group resource identifier, the judging module is specifically configured to: determine that the stored list of operation request identifiers includes the second operation request identifier, and return an error response to a sender of the second member resource operation request; or determine that the stored list of operation request identifiers does not include the second operation request identifier, and send a third member resource operation request to a member device that a member resource included in a sub-group resource identified by the sub-group resource identifier belongs to; or when the second member resource operation request does not carry a sub-group resource identifier, the judging module is specifically configured to: determine that the stored list of operation request identifiers includes the second operation request identifier, and return an error response to the sender of the second member resource operation request; or determine that the stored list of operation request identifiers does not include the second operation request identifier, store the second operation request identifier, and perform an operation indicated in the second member resource operation request.

Optionally, the receiving module is further configured to receive an operation request directed to a member resource; and the apparatus further includes: a generating module, configured to generate a first operation request identifier for the operation request directed to a member resource; and a sending module, configured to send a first member resource operation request to a member device that the member resource belongs to, where the first member resource operation request includes the first operation request identifier, so that the member device that the member resource belongs to determines, according to the first operation request identifier, whether operation request identifiers stored by the member device include the first operation request identifier, and processes the first member resource operation request according to a determination result.

Optionally, the operation request directed to the member resource carries a group resource identifier of a group resource that the member resource belongs to; and the determining module is further configured to determine, according to the group resource identifier, that the first operation request identifier for the operation request directed to the member resource needs to be generated.

Optionally, the determining, by the determining module according to the group resource identifier, that the first operation request identifier for the operation request directed to the member resource needs to be generated includes: determining, according to the group resource identifier, that the group resource identified by the group resource identifier includes a sub-group resource that is used as a member resource; and determining that the first operation request identifier for the operation request directed to the member resource needs to be generated; or determining, according to the group resource identifier, that a sub-group resource included in the group resource identified by the group resource identifier is a remote group resource, or determining, according to the group resource identifier, that a member resource included in the group resource identified by the group resource identifier includes the group resource identified by the group resource identifier; and determining that the first operation request identifier for the operation request directed to the member resource needs to be generated.

Optionally, the determining module is further configured to determine that the operation request directed to a member resource is an update request.

As seen from the technical solutions provided by embodiments of the present invention, a member resource operation request sent to a member device carries an operation request identifier, so that the member device that the member resource belongs to determines, according to the operation request identifier, whether operation request identifiers stored by the member device include the operation request identifier, and processes the member resource operation request according to a determination result. Therefore, subsequent repeated processing of the member resource operation request by the member device may be avoided.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
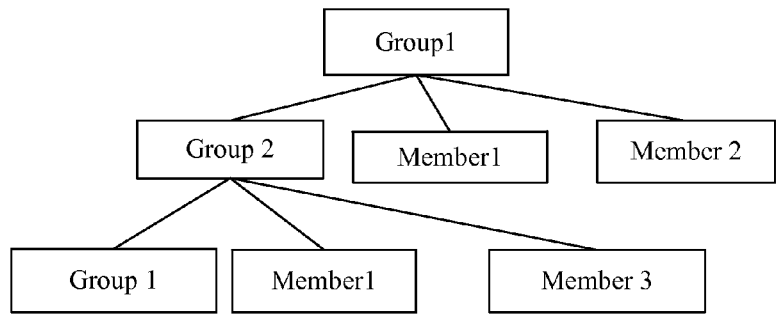
FIG. 1 is a schematic diagram showing that group resources are mutually inclusive according to an embodiment of the present invention.

FIG. 1 is a schematic diagram of a group resource according to an embodiment of the present invention. Specifically, member resources included by a group resource group 1 are: a Group 2 as a sub-group of Group 1, a first member resource M1, and a second member resource M2; while member resources included by a second group resource Group 2 are: a Group 1 as a sub-group of Group 2, a first member resource M1, and a third member resource M3.

It should be noted that in the embodiment of the present invention, a group server may generate an operation request identifier after receiving an operation request directed to a member resource and send a member resource operation request carrying the operation request identifier, and the same group server may also receive, from other group servers, a member resource operation request carrying an operation request identifier. Therefore, for the purpose of differentiation, the member resource operation request sent by the group server or an apparatus for operating a group resource is referred to as a first member resource operation request, where the operation request identifier carried in the first member resource operation request is a first operation request identifier. The member resource operation request received by the same group server or the same apparatus for operating a group resource is referred to as a second member resource operation request, where the identifier carried in the second member resource operation request is a second operation request identifier. That is, in the first member resource operation request and the second member resource operation request and in the first operation request identifier and the second operation request identifier, "first" and "second" are only for differentiating names and have no technical sense.

Figure 2:
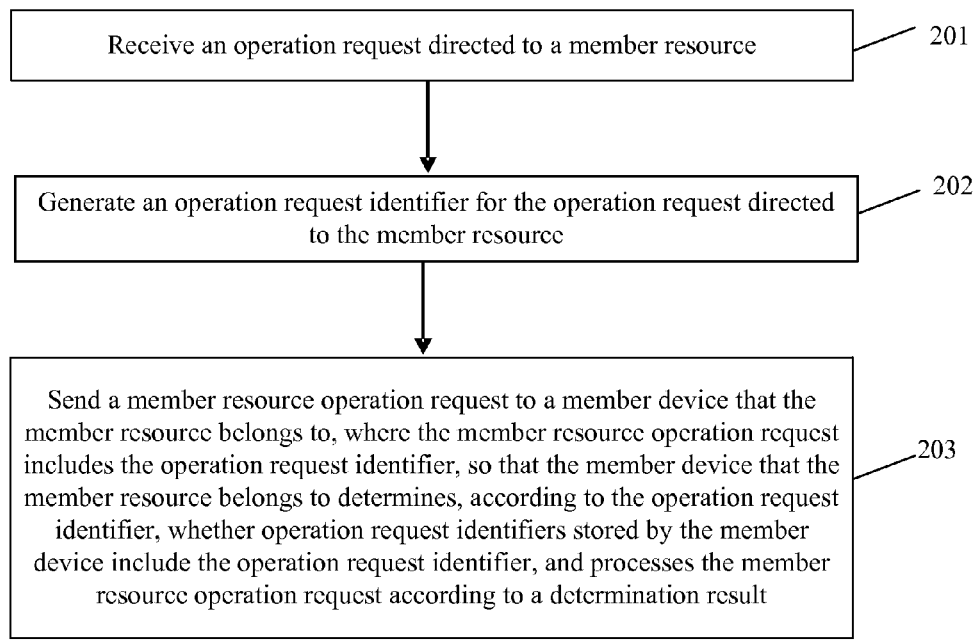
FIG. 2 is a flowchart of a method for operating a group resource according to an embodiment of the present invention.

FIG. 2 is a flowchart of a method for operating a group resource according to an embodiment of the present invention. The method includes the following steps:

Step 201: Receive an operation request directed to a member resource.

Specifically, a group server receives the operation request directed to a member resource in a group resource. The operation request directed to the member resource includes a group resource identifier of the group resource that the member resource belongs to.

For example, the first group server receives a request for accessing the member resource included in the group resource with the group resource identifier Grp1: GET http://g1.example.org/groups/grp1/membersContent/data HTTP/1.11 where: Grp1 is a group resource identifier, "membersContent" indicates that the request is an operation request directed to all member resources in the group resource corresponding to Grp1, and "data" is an instance of suffix data and is used to indicate that the request specifically should access the "data" data of each member resource. Certainly, the operation request directed to the member resource may also be a request such as a member resource update request or a member resource deletion request. In other optional modes, the group resource identifier may also be a name of the group resource, a URL indicating the group resource, and so on, which is not limited herein by the embodiment of the present invention.

Step 202: Generate an operation request identifier for the operation request directed to the member resource.

Specifically, the group server may determine, according to the group resource identifier, that the group resource identified by the group resource identifier includes a sub-group resource that is used as a member resource. In an embodiment of the present invention, herein the sub-group resource is a group resource that is used as a member resource included in other group resource, for example, Group 2 included in Group 1 is a sub-group resource of Group 1, and because Group 1 is also included in Group 2, Group 1 is also a sub-group resource of Group 2. In the case shown in FIG. 1 of the embodiment of the present invention, group resources Group 1 and Group 2 form group nesting.

When the group server determines that the group resource identified by the group resource identifier includes a sub-group resource that is used as a member resource, the determination may be performed according to a list of member resources included in the group resource.

For example, in FIG. 1, a list of member resources included in Group 1 includes:

m 1=coap://d1.example.com/xxx/temp1
m 2=coap://g1.example.com/xxx/temp1
Group 2=http://g1.example.org/groups/grp2;
and a list of member resources included in Group 2 includes:
m 1=coap://d1.example.com/xxx/temp1
m 3=coap://d2.example.org/xxx/temp1
Group 1=http://g1.example.com/groups/grp1

The group server may determine, according to the group resource identifier Grp2 included in the list of member resources included in Group 1, that Group 1 includes a sub-group resource Grp2 that is used as a member resource.

The sub-group resource included in the group resource may be a group resource set in the group server, or may also be a group resource (usually referred to as a remote group resource) set in other group servers. As seen from the above FIG. 1, mutual nesting is allowed between group resources, that is, in FIG. 1, Group 2 serves as a sub-group resource of Group 1, and Group 1 also serves as a sub-group resource of Group 2.

Step 203: Send a member resource operation request to a member device that the member resource belongs to, where the member resource operation request includes the operation request identifier, so that the member device that the member resource belongs to determines, according to the operation request identifier, whether operation request identifiers stored by the member device include the operation request identifier, and processes the member resource operation request according to the determination result.

Specifically, according to the list of member resources included in the group resource, the group server sends a member resource operation request to the member device that the member resource belongs to. If the list of member resources included in the group resource includes a sub-group resource, as shown in FIG. 1, with respect to the Group 1 member resource operation request, the group server sends the member resource operation request to the member device that the member resource included in Group 1 belongs to, namely, the group server that the sub-group resource Group 2 belongs to, the device that Member 1 belongs to, and the device that the Member 2 belongs to.

In all embodiments of the present invention, unless otherwise specified, the group server in M2M may be an M2M platform, an M2M gateway, or an M2M device. That is, in the M2M network, any device, gateway, and platform capable of storing and maintaining group resources and having service middleware may serve as a group server. In addition, the resource in the embodiment of the present invention may be an M2M application, an M2M platform, an M2M terminal, an M2M gateway, and each application or a first data object running on the M2M terminal and M2M gateway, and so on; group nesting is not limited to the M2M service field, and the solution of the present invention is also applicable to other applications with nested groups and repeated members, including groups such as the email group and the contact group in an address book.

Figure 3:
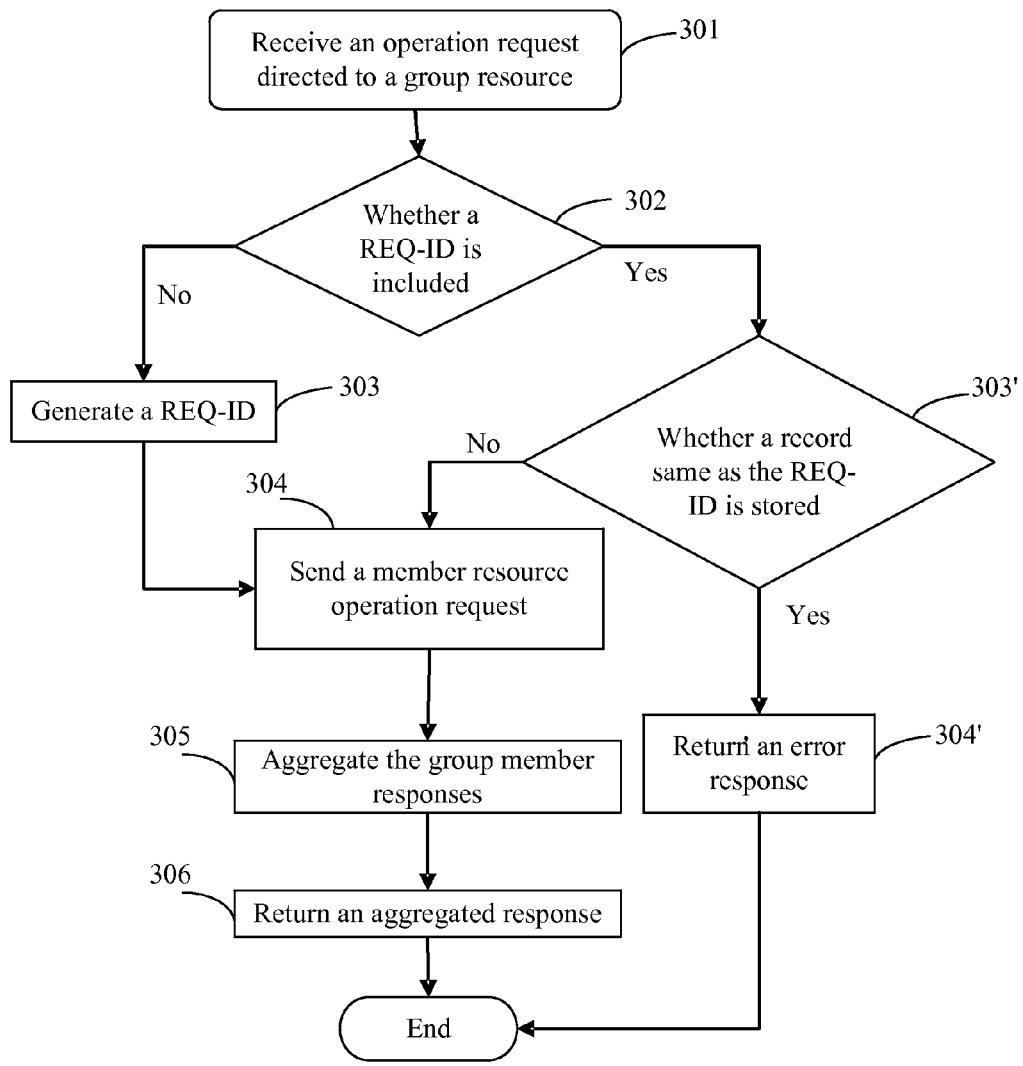
FIG. 3 is a flowchart of another method for operating a group resource according to an embodiment of the present invention.

As seen from the technical solutions provided by embodiments of the present invention, a member resource operation request sent to a member device carries an operation request identifier, so that the member device that the member resource belongs to determines, according to the operation request identifier, whether operation request identifiers stored by the member device include the operation request identifier, and processes the member resource operation request according to a determination result. FIG. 3 is a flowchart of a method for a group server to process a received member resource operation request according to an embodiment of the present invention, where the operation request identifier in the request is a mandatory parameter, and the method includes the following steps:

Step 301: A group server receives an operation request directed to a group resource.

Specifically, the operation request directed to a group resource may be an operation request directed to a member resource. The operation request directed to a member resource may be the access request directed to a member resource in step 201, or an update request directed to a member resource or other requests, which is not limited herein by the embodiment of the present invention, where the operation request directed to a member resource includes a group resource identifier of the group resource that the member resource belongs to.

Alternatively, the operation request directed to a group resource received by the group server may be a member resource operation request carrying a REQ-ID, where the member resource operation request may also carry a sub-group resource identifier of a sub-group resource that is used as a member resource.

Step 302: The group server determines whether the operation request directed to a group resource carries the operation request identifier REQ-ID; and if the operation request directed to a group resource does not carry the REQ-ID, the operation request directed to a group resource is an operation request directed to a member resource of the group resource and the group server performs step 303, or otherwise, the operation request directed to a group resource is a member resource operation request and step 303' is performed.

Step 303: The group server generates the REQ-ID for the operation request directed to a group resource and records the generated REQ-ID.

In the embodiment of the present invention, the REQ-ID generated by the group server is a unique identifier of the operation request directed to a member resource. Specifically, the REQ-ID may be obtained by performing a hash encryption algorithm for the identifier of the group server (such as the address of the group server) plus a random number generated by the group server.

However, in the embodiment of the present invention, the REQ-ID may be carried in a message header or message body of the operation request directed to a member resource, which is not limited herein by the embodiment of the present invention.

In addition, after generating the REQ-ID, the group server further needs to store the generated REQ-ID. Specifically, the group server may store the REQ-ID as a group resource attribute in the group resource, for example, requestTag, so as to indicate that the first group server has processed the operation request directed to a member resource corresponding to the REQ-ID.

Step 303': After the group server determines that the received operation request directed to a group resource carries the REQ-ID (namely, after determining that the operation request directed to a group resource is a member resource operation request), the group server compares the carried REQ-ID with the REQ-ID recorded in the group resource attribute requestTag and processed by the group server, and determines whether a list recorded in the requestTag stores a REQ-ID same as the carried REQ-ID. If the REQ-ID carried in the member resource operation request is stored in the list recorded in the requestTag, step 304' is performed, or otherwise, step 304 is performed.

Step 304: If the member resource operation request carrying the REQ-ID does not carry a sub-group resource identifier, the group server performs the operation indicated in the member resource operation request carrying the REQ-ID, and stores the REQ-ID carried in the member resource operation request into the group resource attribute requestTag; or if the member resource operation request carrying the REQ-ID further carries a sub-group resource identifier, the group server sends a third member resource operation request to a member device that a member resource included in the sub-group resource identified by the sub-group resource identifier belongs to, and stores the REQ-ID carried in the member resource operation request into the group resource attribute requestTag. The third member resource operation request is generated according to the second member resource operation request, and is directed to each member resource included in the sub-group resource identified by the sub-group identifier.

Certainly, adding the attribute requestTag to the group resource to record the REQ-ID carried in the member resource operation request is only one way of recording the REQ-ID. In addition, the group server may maintain the list REQ-IDs of requests processed by each group, or maintain the list by using other feasible methods, which is not limited herein by the embodiment of the present invention. For simplicity, no repeated explanation and stress are provided in the following steps and embodiments, and the requestTag method is used as an example for description.

Step 304': The group server determines that the REQ-ID carried in the member resource operation request is stored in the list recorded in the requestTag. In this case, the operation indicated in the member resource operation request corresponding to the carried REQ-ID has been processed. The group server returns an error response (loop detected, loop detected) to the sender of the member resource operation request (other group servers), indicating that the request message is sent repeatedly.

Step 305: The group server receives from each member device a response message for the member resource operation request, and aggregates the response message returned by each member device.

Certainly, if the response message received by the group server includes an error response returned by the member device, the group server may ignore the error response returned by each member device; in an optional mode, the group server may also aggregate the error responses.

Step 306: The group server returns an aggregated response message and ends the procedure.

Figure 4:
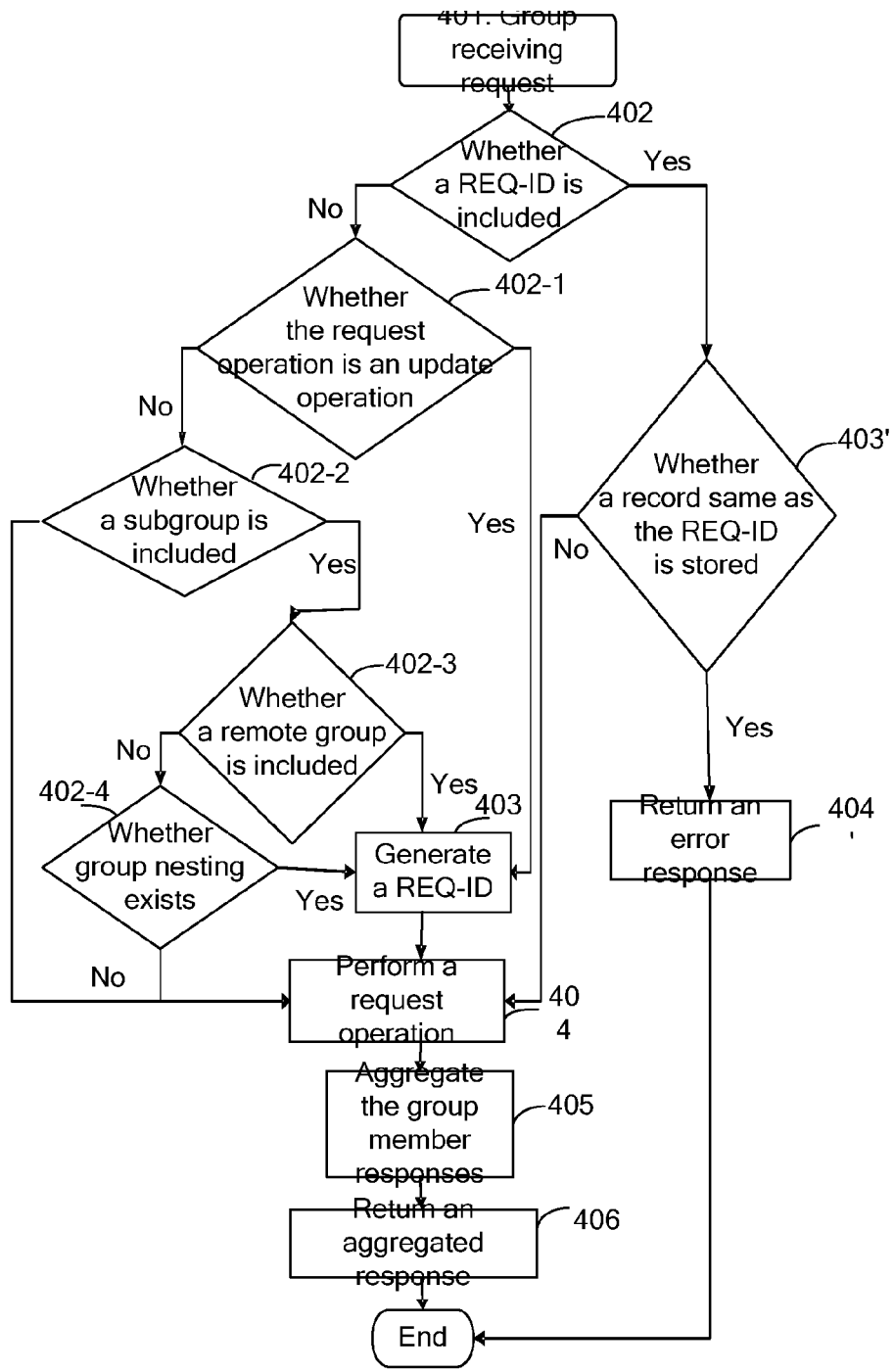
FIG. 4 is a flowchart of still another method for operating a group resource according to an embodiment of the present invention.

FIG. 4 is a flowchart of still another method for operating a group resource according to an embodiment of the present invention. Different from the operation request identifier in the embodiment provided in FIG. 3, the operation request identifier in the request in this embodiment is not a mandatory parameter, and after the group server determines that the received operation request directed to a group resource is an operation request directed to a member resource, the group server further needs to determine, according to different conditions, whether to generate an operation request identifier REQ-ID for the operation request directed to a member resource. The embodiment shown in FIG. 4 includes the following steps:

Step 401: A group server receives an operation request directed to a group resource.

Specifically, the operation request directed to a group resource may be an operation request directed to a member resource. The operation request directed to the member resource may be the access request directed to a member resource in step 201, or an update request directed to a member resource or other requests, which is not limited herein by the embodiment of the present invention, where the operation request directed to a member resource includes a group resource identifier of the group resource that the member resource belongs to.

Alternatively, the operation request directed to a group resource received by the group server is a member resource operation request carrying a REQ-ID, where the member resource operation request may also carry the group resource identifier of the group resource that the member resource belongs to.

Step 402: The group server determines whether the operation request directed to a group resource carries the operation request identifier REQ-ID; and if the operation request directed to a group resource does not carry the REQ-ID, the operation request directed to a group resource is an operation request directed to a member resource and step 402-1 is performed, or otherwise, the operation request directed to a group resource is a member resource operation request and step 403' is performed.

Step 402-1: The group server determines whether the received operation request is an update request, and if so, performs step 403, or otherwise, performs step 402-2.

Step 402-2: The group server determines, according to the group resource identifier carried in the operation request directed to a member resource, whether the group resource identified by the group resource identifier includes a sub-group resource (subgroup) that is used as a member resource, and if the group resource identified by the group resource identifier includes a sub-group resource (subgroup) that is used as a member resource, performs step 402-3, or otherwise, performs step 404.

Step 402-3: The group server determines whether the sub-group resource (subgroup) included in the group resource is a remote sub-group resource (remote subgroup). If so, the group server performs step 403; otherwise the group server performs step 402-4.

In the embodiment of the present invention, the remote sub-group resource is a group resource created by other group servers, and the group resource created by the other group servers serves that is used as a member resource of the group resource identified by the group resource identifier carried in the operation request directed to a member resource. For example, assuming that the received member resource operation request is: GET http://g1.example.org/groups/grp3/membersContent/data HTTP/1.1, the group server receiving the member resource operation request is g1, and the group resource identifier carried in the operation request directed to a member resource is grp3; assuming that the member resources included in the group resource Group 3 corresponding to the group resource identifier grp3 are as follows:

m 1=coap://d1.example.com/xxx/temp1
m 3=coap://d2.example.org/xxx/temp1
Group 4=http://g4.example.com/groups/grp4
the group server g1 determines, according to the member resource: Grp4=http://g4.example.com/groups/grp4, that the group server that the group resource Group 4 corresponding to grp4 belongs to is g4 rather than g1. Therefore, the sub-group resource Group 4 included in Group 3 is a remote sub-group resource. Specifically, in step 402-3, the group server determines that the subgroup resource (Group 4) included in the group resource Group 3 includes a remote sub-group resource (Group 4).

402-4. The group server determines whether the group resource (assumed to be a group resource) identified by the group resource identifier carried in the operation request directed to a member resource has a nested group. In other words, the group server determines whether the member resource included in the group resource includes a sub-group resource, and whether the member resource included in the sub-group resource includes a group resource, that is, whether the group resource identified by the group resource identifier carried in the operation request directed to a member resource and the sub-group resource included in the group resource are sub-group resources of each other. Further, the group server obtains the list of member resources included in the group resource, and the list of member resources included in the sub-group resource (namely, the subgroup resource) when the member resource included in the group resource includes a sub-group resource (assumed to be a subgroup resource), and then determines whether the member resource included in the sub-group resource includes the group resource (namely, the group resource) identified by the group resource identifier carried in the operation request directed to a member resource.

In an embodiment, assuming that the received member resource operation request is: GET http://g1.example.org/groups/grp1/membersContent/data HTTP/1.1, in FIG. 1, a list of member resources included in Group 1 includes:
m 1=coap://d1.example.com/xxx/temp1
m 2=coap://g1.example.com/xxx/temp1
Group 2=http://g1.example.org/groups/grp2;
and a list of member resources included in Group 2 includes:
m 1=coap://d1.example.com/xxx/temp1
m 3=coap://d2.example.org/xxx/temp1
Group 1=http://g1.example.com/groups/grp1

In this case, group resources Group 1 and Group 2 respectively have a nested group. In this step, the group server g1 needs to determine whether Group 1 has a nested group according the member resource included in the member resource Group 2 included in Group 1, and in this case, the group server needs to obtain the list of member resources of the member resource Group 2 included in Group 1. The foregoing group server that Group 2 belongs to and the group server that Group 1 belongs to are both g1; therefore, g1 may easily obtain the member resource included in Group 2.

Assuming that the access address of the member resource Group 2 included in Group 1 is: Grp2=http://g2.example.org/groups/grp2, the g1 further needs to obtain the member resource included in Group 2 from the group server g1 according to the access address of Group 2, namely, Grp2=http://g2.example.org/groups/grp2. In an optional mode, during execution of the present invention, when the group server g1 determines that the group server that the member resource Group 2 included in Group 1 belongs to is g2, the group server g1 may directly determine, according to step 402-2, that the sub-group resource Group 2 included in the group resource Group 1 includes a remote sub-group resource Group 2, and does not need to obtain the member resource included in Group 2 from the group server g2 that Group 2 belongs to.

Step 403 is the same as step 303, and is not further described herein in the embodiment of the present invention.

Step 403' is the same as step 303', and is not further described herein in the embodiment of the present invention.

Step 404 is the same as step 304, and is not further described herein in the embodiment of the present invention.

Step 404' is the same as step 304', and is not further described herein in the embodiment of the present invention.

Step 405 is the same as step 305, and is not further described herein in the embodiment of the present invention.

Step 406 is the same as step 306, and is not further described herein in the embodiment of the present invention.

It should be noted that: step 402-1 to step 402-4 are optional, and some of the steps may be selected; in addition, step 402-1 and step 402-2 to step 402-4 may be in any sequence.

Figure 5:
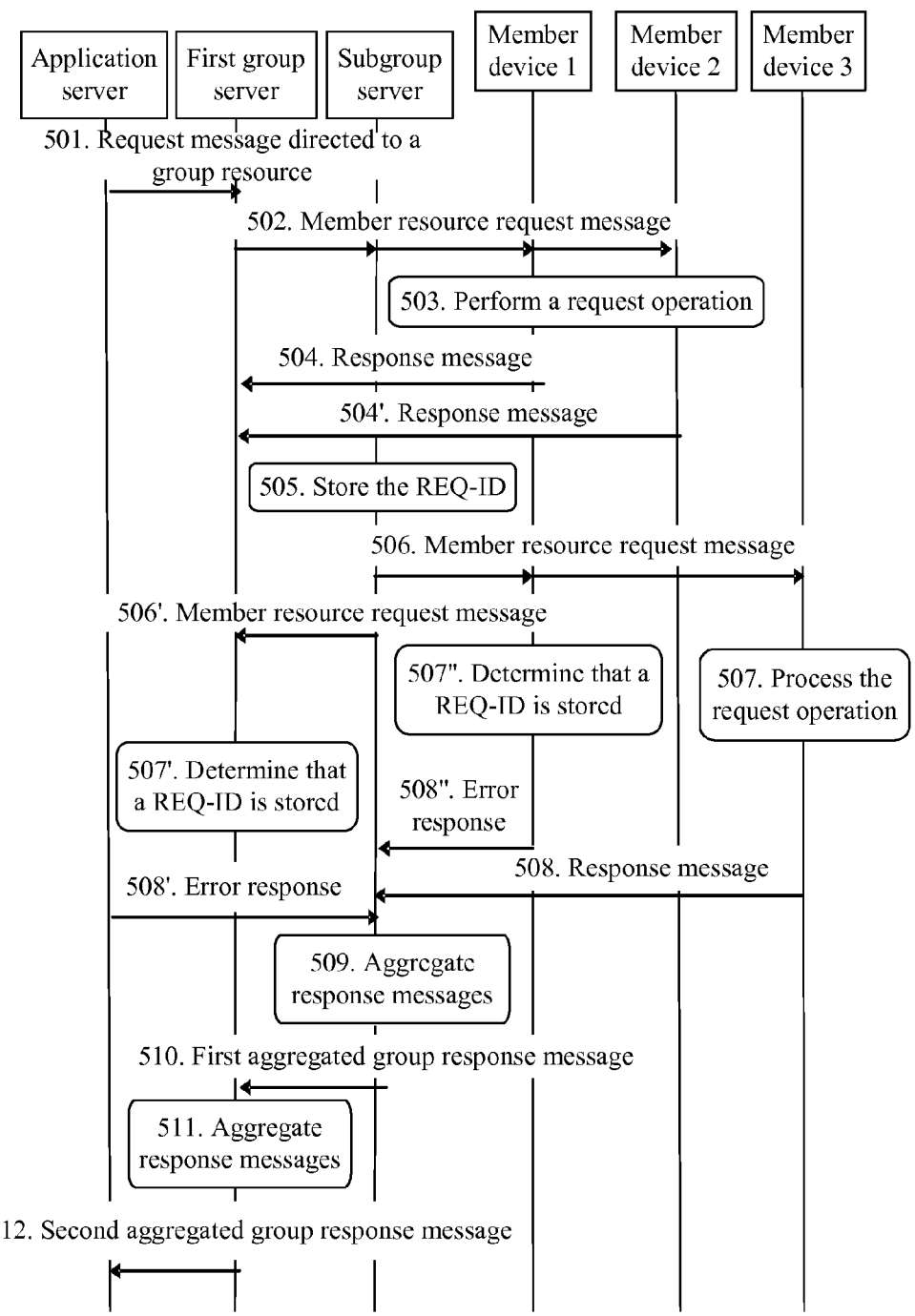
FIG. 5 is a flowchart of a method of an operation request directed to a member resource in a group resource with a nested group according to an embodiment of the present invention.

FIG. 5 is a flowchart of a method of an operation request directed to a member resource in a group resource with a nested group according to an embodiment of the present invention.

Using the group resource Group 1 shown in FIG. 1 as an example, the method includes the following steps:

Step 501: An application server sends an operation request directed to a group resource Group 1 to the first group server g1 where the group resource Group 1 is located.

Specifically, the application server may be an independent application server, or may also be an application server of the M2M network, or an application module arranged in the gateway, or an application module arranged in the M2M device; the application server may also be a module at a service capability layer of the host device where the group resource is located.

Similarly to step 301, the operation request directed to the group resource Group 1 may be an operation request directed to a member resource or a member resource operation request carrying a REQ-ID. In addition, the operation request directed to the group resource Group 1 carries a group resource identifier of Group 1. In this embodiment of the present invention, it is assumed that the operation request directed to the group resource Group 1 is an operation request directed to a member resource. In addition, the operation request directed to a member resource may be a request such as an access request directed to a member resource or an update or deletion request directed to a member resource similar to that in step 201, and is not limited herein by this embodiment of the present invention.

After receiving the operation request directed to the group resource Group 1, the first group server g1 determines that the operation request directed to a group resource does not carry an operation request identifier REQ-ID, that is, the operation request directed to the group resource Group 1 is an operation request directed to a member resource. Any one of steps 402-1 to 402-4 is performed.

In this embodiment of the present invention, it is assumed that: the member resource included by Group 1 includes a sub-group resource Group 2 and Group 2 belongs to a second group server, that is, Group 2 is a remote sub-group, and Group 2 also includes Group 1, that is, the first group server may determine, in step 402-3, that Group 1 includes a remote sub-group. Therefore, the first group server may perform step 403 after any step of steps 402-1 to 402-4 when performing steps 402-1 to 402-4, that is, generate a REQ-ID for the operation request directed to a member resource and record the generated REQ-ID.

Certainly, in another optional mode, the first group server may also directly perform step 402-1 after determining that the received operation request directed to a group resource does not carry the operation request identifier REQ-ID, that is, the operation request directed to the group resource Group 1 is an operation request directed to a member resource, and determine whether the operation request directed to a member resource is an update request. Because the operation request directed to a member resource is an update request, the first group server generates a REQ-ID for the operation request directed to a member resource and records the generated REQ-ID, and does not perform any step of steps 402-2 to 402-4, or otherwise, performs step 402-2 to step 402-4.

Step 502: The first group server performs the operation indicated in the operation request directed to a member resource, that is, adding the generated REQ-ID to the member resource operation request and sending the request to the member device that each member resource included in Group 1 belongs to, namely, the second group server g2, member device 1, and member device 2.

Step 503: After receiving the member resource operation request, the member device 1 and member device 2 perform the operation indicated in the member resource operation request.

Specifically, the member device 1 and member device 2 determine that the member resource operation request carries a REQ-ID, and determines that the REQ-ID carried in the member resource operation request is stored in the list recorded in the requestTag. Therefore, the operation indicated in the member resource operation request corresponding to the carried REQ-ID has been performed, the operation indicated in the operation request is not performed again, and an error response is returned to the first group server.

However, in this embodiment of the present invention, assuming that the member device 1 and member device 2 determine that the REQ-ID carried in the member resource operation request is not stored in the list recorded in the requestTag, the member device 1 and member device 2 store the REQ-ID carried in the member resource operation request into the list recorded in the requestTag, and perform the operation indicated in the member resource operation request.

Steps 504 and 504': The member device 1 and member device 2 respectively return a response message to the first group server.

Step 505: The second group server determines that the REQ-ID carried in the member resource operation request is not stored in the list recorded in the requestTag. Therefore, the second group server stores the REQ-ID carried in the member resource operation request into the list recorded in the requestTag.

Certainly, if the second group server determines that the REQ-ID carried in the member resource operation request is stored in the list recorded in the requestTag, the operation indicated in the member resource operation request corresponding to the REQ-ID has been performed, the operation indicated in the operation request is not performed again, and an error response is returned to the first group server.

Steps 506 and 506': The second group server sends a member resource operation request to the member resource Group 1, member device 1, and member device 3 included in Group 2 respectively.

Step 507 is similar to step 503. The member device 3 determines that the REQ-ID carried in the member resource operation request is not stored in the list recorded in the requestTag. Therefore, the member device 3 stores the REQ-ID carried in the member resource operation request into the list recorded in the requestTag, and performs the operation indicated in the member resource operation request.

Step 507' and step 507": The first group server and member device 1 determine that the REQ-ID carried in the member resource operation request is stored in the list recorded in the requestTag. Therefore, the operation indicated in the member resource operation request corresponding to the carried REQ-ID has been performed, and the operation indicated in the operation request is not performed again.

Step 508: The member device 3 returns a response message to the second group server.

Step 508' and step 508": The first group server and member device 1 respectively return an error response to the second group server.

Step 509: The second group server aggregates the response messages received from the first group server, member device 1, and member device 3. However, because both the first group server and member device 1 return error responses, the second group server does not need to aggregate the response message returned by the member device 3.

Step 510: The second group server returns a first aggregated group response message to the first group server.

Step 511: The first group server aggregates the response messages from the member device 1 and member device 2, and the first aggregated group response message from the second group server.

Step 512: The first group server returns a second aggregated group member response message to the application server.

In FIG. 5, it is assumed that group1 and Group 2 are located in different group servers, and that Group 2 is a remote sub-group of group 1. In an optional mode, group1 and Group 2 may be located in a same group server, that is, Group 2 is a local sub-group of group1.

Figure 6:
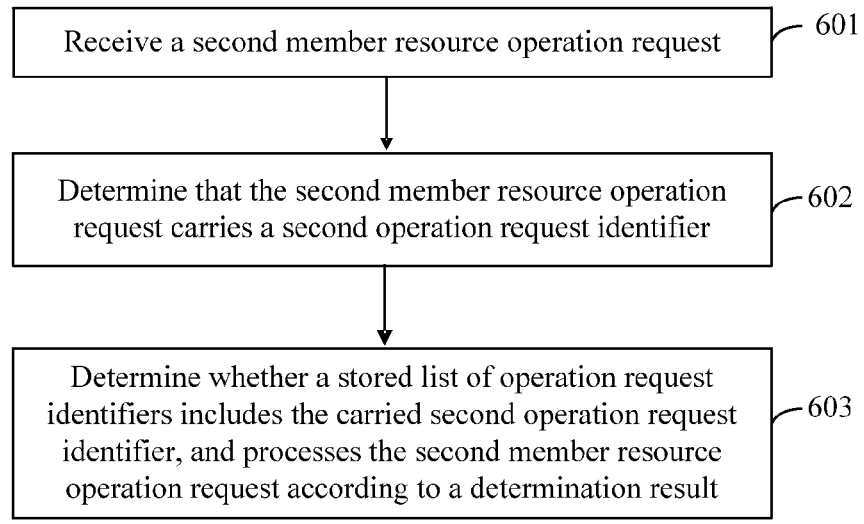
FIG. 6 is a flowchart of a method for operating a group resource according to an embodiment of the present invention.

FIG. 6 is a flowchart of a method for operating a group resource according to an embodiment of the present invention. The method includes the following steps:

Step 601: Receive a second member resource operation request.

Specifically, the member device receives the member resource operation request sent by a group server that the member device belongs to, or a group server such as g2 receives the second member resource operation request sent by another group server g1 (as shown in step 502). Therefore, in the embodiment of the present invention, the member device or group server receiving the second request is called an apparatus for operating a group resource.

Step 602: Determine that the second member resource operation request carries a second operation request identifier.

Specifically, the apparatus for operating a group resource determines that the second member resource operation request sent by the group server includes a second operation request identifier. Certainly, the apparatus for operating a group resource (especially a member device) may also receive an operation request directed to a member resource, where the operation request directed to a member resource does not carry an operation request identifier. The embodiment of the present invention does not describe the operation after receiving the operation request directed to a member resource, where the operation request directed to a member resource does not carry an operation request identifier is received.

Step 603: Determine whether a stored list of operation request identifiers includes the carried second operation request identifier, and processes the second member resource operation request according to the determination result.

Specifically, processing the second member resource operation request according to the determination result is as follows:

When the second member resource request further carries a sub-group resource identifier, the processing the second member resource operation request according to the determination result includes: determining that the stored list of operation request identifiers includes the second operation request identifier, and returning an error response to the sender of the second member resource operation request; or determining that the stored list of operation request identifiers does not include the second operation request identifier, and sending a third member resource operation request to the member device that the member resource included in the group resource identified by the sub-group resource identifier belongs to; or when the second member resource request does not carry a sub-group resource identifier, the processing the second member resource operation request according to the determination result includes: determining that the stored list of operation request identifiers includes the second operation request identifier, and returning an error response to the sender of the second member resource operation request; or determining that the stored list of operation request identifiers does not include the second operation request identifier, storing the second operation request identifier, and performing the operation indicated in the member resource operation request.

In the above embodiment, after receiving the second member resource operation request, the apparatus for operating a group resource may determine that the second member resource operation request includes a second operation request identifier, and process the second member resource operation request according to the determination result, thus avoiding repeated processing of the processed operation request.

In addition, as a supplement to the embodiment corresponding to FIG. 6, because the apparatus for operating a group resource may be a group server, the apparatus may also perform the steps performed by the group server in the embodiments corresponding to FIG. 2 to FIG. 4, which is not further described herein.

FIG. 7 is a schematic structural diagram of a group server according to an embodiment of the present invention. The group server includes:

a receiving module 701, configured to receive an operation request directed to a member resource; a generating module 702, configured to generate a first operation request identifier for the operation request directed to a member resource; and a sending module 703, configured to send a first member resource operation request to a member device that the member resource belongs to, where the first member resource operation request includes the first operation request identifier, so that the member device that the member resource belongs to determines, according to the first operation request identifier, whether operation request identifiers stored by the member device include the first operation request identifier, and processes the first member resource operation request according to the determination result.

Further, the member resource operation request carries a group resource identifier of a group resource that the member resource belongs to; and the group server further includes a determining module 704, configured to determine, according to the group resource identifier, that the first operation request identifier for the operation request directed to a member resource needs to be generated.

Further, the determining module 704 is specifically configured to: determine, according to the group resource identifier, that the group resource identified by the group resource identifier includes a sub-group resource that is used as a member resource; and determine that the first operation request identifier for the operation request directed to a member resource needs to be generated; or the determining module 704 is specifically configured to: determine, according to the group resource identifier, that a sub-group resource included in the group resource identified by the group resource identifier is a remote group resource, or determine, according to the group resource identifier, that a member resource included in the group resource identified by the group resource identifier includes the group resource identified by the group resource identifier; and determine that the first operation request identifier for the operation request directed to a member resource needs to be generated.

Further, the group server further includes: an operation request determining module 705, configured to determine that the operation request directed to a member resource is an update request.

Further, the receiving module 701 is further configured to receive a second member resource operation request, where the second member resource operation request includes a second operation request identifier; and the group server further includes a judging module 706, configured to determine that a stored list of operation request identifiers includes the second operation request identifier, and return an error response to the sender of the second member resource operation request; or configured to determine that the stored list of operation request identifiers does not include the second operation request identifier, store the second operation request identifier, and perform an operation indicated in the second member resource operation request; or the receiving module 701 is further configured to receive a second member resource operation request, where the second member resource operation request includes a second operation request identifier and a sub-group resource identifier; and the judging module 706 is configured to determine that the stored list of operation request identifiers includes the second operation request identifier, and return an error response to the sender of the second member resource operation request; or configured to determine that the stored list of operation request identifiers does not include the second operation request identifier, and send a third member resource operation request to a member device that a member resource included in a group resource identified by the sub-group resource identifier belongs to.

Figure 7A:
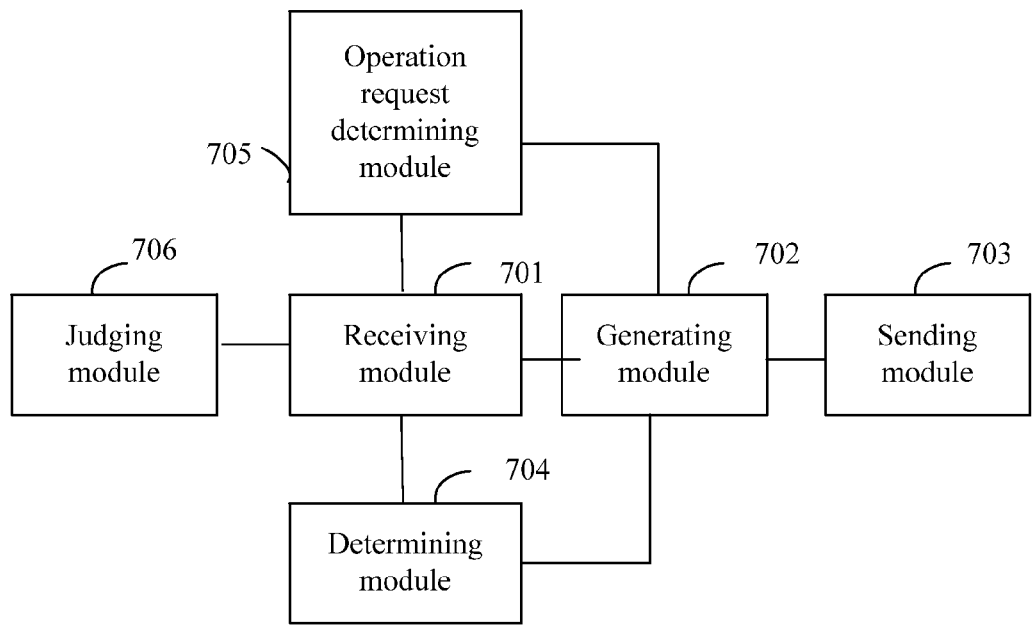
FIG. 7A is a schematic structural diagram of a group server according to an embodiment of the present invention.
Figure 7B:
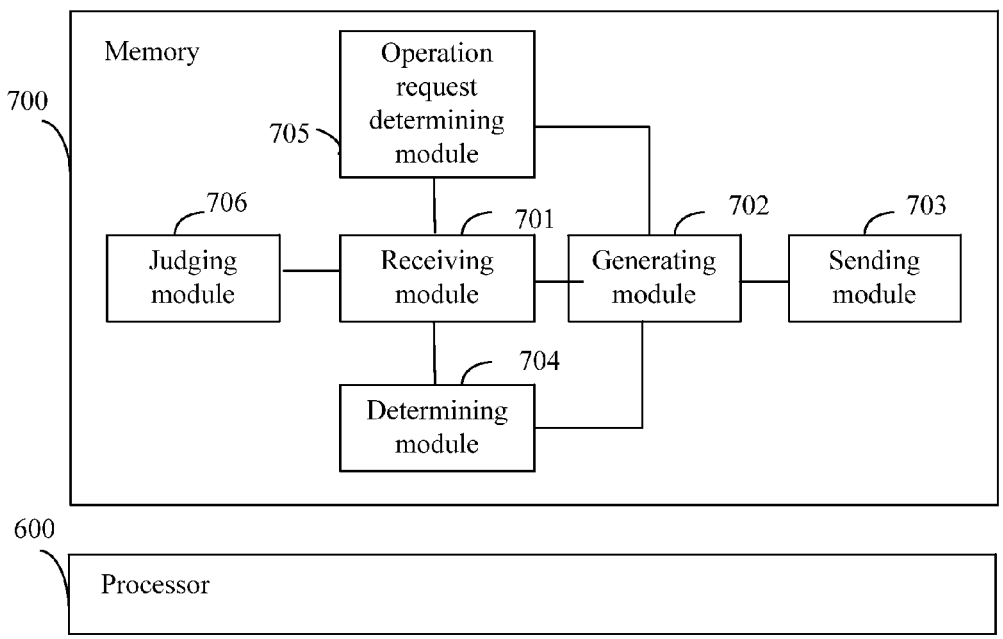
FIG. 7B is a schematic structural diagram of another group server according to an embodiment of the present invention.

FIG. 7b is a schematic structural diagram of another group server according to an embodiment of the present invention. The group server includes a memory 700 and a processor 600. The memory 700 is configured to store the modules shown in FIG. 7a, and the processor 600 is connected to the memory 700, and runs each module in the memory 700 to execute the corresponding function of each module in the memory 700. In FIG. 7b, the function of each module in the memory 700 is the same as the function of each module in FIG. 7a, and is not further described herein in the embodiment of the present invention.

Figure 8A:
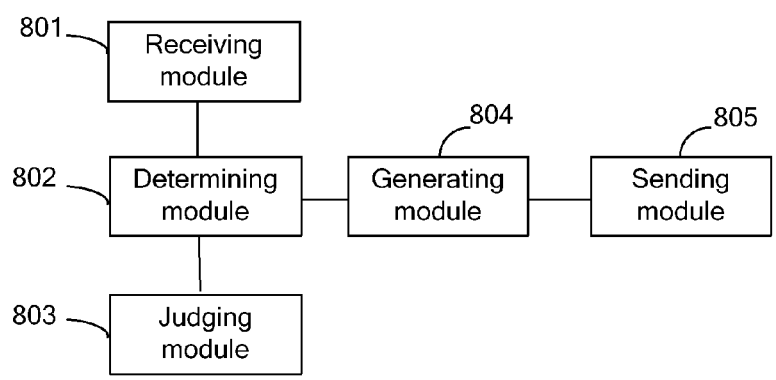
FIG. 8A is a schematic structural diagram of an apparatus for operating a group resource according to an embodiment of the present invention.

FIG. 8a is a schematic structural diagram of an apparatus for operating a group resource according to an embodiment of the present invention. The apparatus includes: a receiving module 801, configured to receive a second member resource operation request; a determining module 802, configured to determine that the second member resource operation request carries a second operation request identifier; and a judging module 803, configured to determine whether a stored list of operation request identifiers includes the operation request identifier, and process the second member resource operation request according to the determination result.

Optionally, when the second member resource operation request further carries a sub-group resource identifier, the judging module 803 is specifically configured to: determine that the stored list of operation request identifiers includes the second operation request identifier, and return an error response to a sender of the second member resource operation request; or determine that the stored list of operation request identifiers does not include the second operation request identifier, and send a third member resource operation request to a member device that a member resource included in a sub-group resource identified by the sub-group resource identifier belongs to; or when the second member resource operation request does not carry a sub-group resource identifier, the judging module is specifically configured to: determine that the stored list of operation request identifiers includes the second operation request identifier, and return an error response to the sender of the second member resource operation request; or determine that the stored list of operation request identifiers does not include the second operation request identifier, store the second operation request identifier, and perform an operation indicated in the second member resource operation request.

Optionally, the receiving module 801 is further configured to receive an operation request directed to a member resource. A generating module 804 is configured to generate a first operation request identifier for the operation request directed to a member resource; and a sending module 805 is configured to send a first member resource operation request to a member device that the member resource belongs to, where the first member resource operation request includes the first operation request identifier, so that the member device that the member resource belongs to determines, according to the first operation request identifier, whether operation request identifiers stored by the member device include the first operation request identifier, and processes the member resource operation request according to the determination result.

Optionally, the member resource operation request carries a group resource identifier of a group resource that the member resource belongs to; and the determining module 802 is further configured to determine, according to the group resource identifier, that the first operation request identifier for the operation request directed to the member resource needs to be generated.

Optionally, the determining, by the determining module 802 according to the group resource identifier, that the first operation request identifier for the operation request directed to the member resource needs to be generated includes: determining, according to the group resource identifier, that the group resource identified by the group resource identifier includes a sub-group resource that is used as a member resource; and determining that the first operation request identifier for the operation request directed to the member resource needs to be generated; or determining, according to the group resource identifier, that a sub-group resource included in the group resource identified by the group resource identifier is a remote group resource, or determining, according to the group resource identifier, that a member resource included in the group resource identified by the group resource identifier includes the group resource identified by the group resource identifier; and determining that the first operation request identifier for the operation request directed to the member resource needs to be generated.

Optionally, the determining module 802 is further configured to determine that the operation request directed to the member resource is an update request.

Figure 8B:
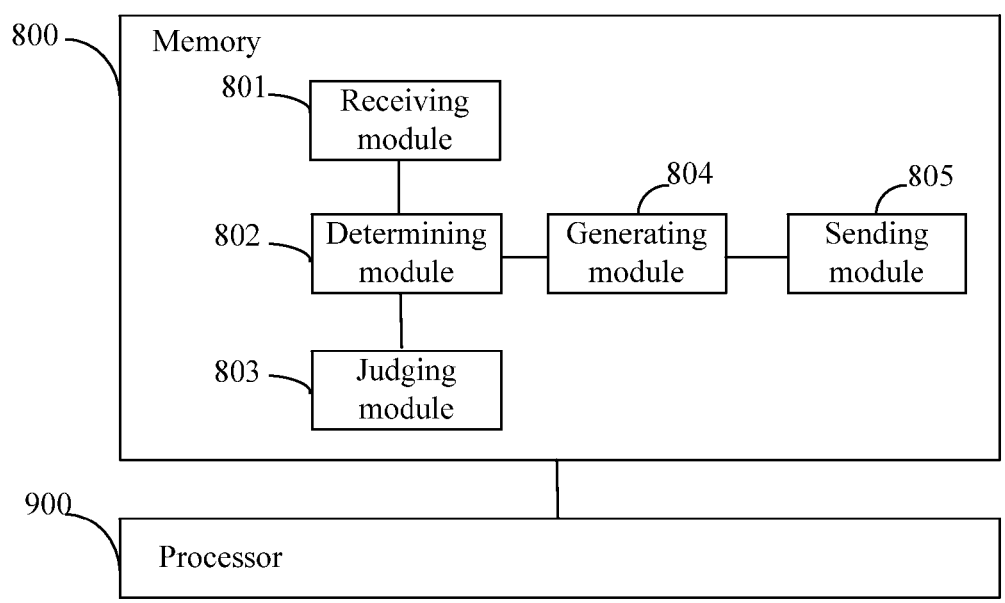
FIG. 8B is a schematic structural diagram of another apparatus for operating a group resource according to an embodiment of the present invention.

FIG. 8b is a schematic structural diagram of another apparatus for operating a group resource according to an embodiment of the present invention. The apparatus includes a memory 800 and a processor 900. The memory 800 is configured to store the modules shown in FIG. 8a, and the processor 900 is connected to the memory 800, and runs each module in the memory 800 to execute the corresponding function of each module in the memory 800. In FIG. 8b, the function of each module in the memory 800 is the same as the function of each module in FIG. 8a, and is not further described herein in the embodiment of the present invention.

As seen from the technical solutions provided by embodiments of the present invention, a member resource operation request sent to a member device carries an operation request identifier, so that the member device that the member resource belongs to determines, according to the operation request identifier, whether operation request identifiers stored by the member device include the operation request identifier, and processes the member resource operation request according to a determination result. If the operation request identifiers stored by the member device include the operation request identifier, an error response is returned, and the member resource operation request is not further processed. Therefore, subsequent repeated processing of the member resource operation request by the member device may be avoided.

The implementation of the processing function of each module included in the group server or the apparatus for operating a group resource is described in the foregoing method embodiments, and is not further described herein. In addition, in the M2M network, the M2M platform may be a computer or a device with a processor. The M2M gateway and M2M terminal are not strictly differentiated in terms of devices, for example, the device serving as a gateway may also serve as a terminal; in addition, various terminal devices, such as the mobile phone, computer, personal digital assistant PDA, notebook computer, remote controller, home electrical appliance, instruments, and sensor, may serve as the gateway or terminal of the M2M network. In the preceding module embodiments, the apparatus is divided into modules by function logic, but the division is not limited by the present invention, so long as the corresponding functions can be implemented. In addition, the specific names of the functional modules are only used for differentiation, and not intended to limit the protection scope of the present invention. The function of each functional module in the above method for operating a group resource, the group server, or the apparatus for operating a group resource may be implemented by each module run by the processor of the group server or apparatus for operating a group resource, and the method performed by the group server and the function of each functional module of the group server may be implemented by the processor of the group server.

In addition, the group server in FIG. 7a and FIG. 7b may perform any step performed by the group server in the foregoing method embodiments; the apparatus for operating a group resource in FIG. 8a and FIG. 8b may perform any step performed by the group server in the foregoing method embodiments, and may also perform any step performed by the member device in the foregoing method embodiments, which is not further described herein.

The foregoing descriptions are merely exemplary embodiments of the present invention, but not intended to limit the present invention. Any variation or replacement made by persons skilled in the art without departing from the spirit of the present invention shall fall within the protection scope of the present invention. Therefore, the protection scope of the present invention shall be subject to the appended claims.

What is claimed is:
1. A method for operating a group resource, comprising:
receiving an operation request directed to a member resource; wherein, the member resource operation request carries a group resource identifier of a group resource that the member resource belongs to;
determining, according to the group resource identifier, at least one of which the group resource identified by the group resource identifier comprises a sub-group resource that is used as a member resource, which a member resource comprised in the group resource identified by the group resource identifier comprises the group resource identified by the group resource identifier, and which the operation request directed to the member resource is an update request;
determining that a first operation request identifier for the operation request directed to the member resource needs to be generated;
generating the first operation request identifier for the operation request directed to the member resource; and
sending a first member resource operation request to a member device that the member resource belongs to, wherein the first member resource operation request comprises the first operation request identifier, so that the member device that the member resource belongs to determines, according to the first operation request identifier, whether operation request identifiers stored by the member device comprise the first operation request identifier, and processes the first member resource operation request according to a determination result.

2. The method according to claim 1, further comprising:
determining that the sub-group resource comprised in the group resource identified by the group resource identifier is a remote group resource.

3. The method according to claim 1, wherein:
the method further comprises: receiving a second member resource operation request, wherein the second member resource operation request comprises a second operation request identifier; determining that a stored list of operation request identifiers comprises the second operation request identifier, and returning an error response to a sender of the second member resource operation request, or determining that the stored list of operation request identifiers does not comprise the second operation request identifier, storing the second operation request identifier, and performing an operation indicated in the second member resource operation request.

4. The method according to claim 1, wherein:
the method further comprises: receiving a second member resource operation request, wherein the second member resource operation request comprises a second operation request identifier and a sub-group resource identifier; and when determining that a stored list of operation request identifiers comprises the second operation request identifier, returning an error response to a sender of the second member resource operation request, or when determining that the stored list of operation request identifiers does not comprise the second operation request identifier, sending a third member resource operation request to a member device that a member resource comprised in the sub-group resource identified by the sub-group resource identifier belongs to.

5. A method for operating a group resource, comprising:
receiving a second member resource operation request;
determining that the second member resource operation request carries a second operation request identifier; and
determining whether a stored list of operation request identifiers comprises the second operation request identifier;
when determining that the stored list of operation request identifiers comprises the second operation request identifier, returning an error response to a sender of the second member resource operation request; and when determining that the stored list of operation request identifiers does not comprise the second operation request identifier, storing the second operation request identifier, and processing the second member resource operation request.

6. The method according to claim 5, wherein: when the second member resource operation request further carries a sub-group resource identifier the processing the second member resource operation request comprises:
sending a third member resource operation request to a member device that a member resource comprised in a sub-group resource identified by the sub-group resource identifier belongs to; and
when the second member resource operation request does not carry the sub-group resource identifier, the processing the second member resource operation request comprises performing an operation indicated in the second member resource operation request.

7. The method according to claim 5, further comprising:
receiving an operation request directed to a member resource; wherein, the operation request directed to a member resource carries a group resource identifier of a group resource that the member resource belongs to;
determining, according to the group resource identifier, at least one of which the group resource identified by the group resource identifier comprises a sub-group resource that is used as a member resource, which a member resource comprised in the group resource identified by the group resource identifier comprises the group resource identified by the group resource identifier, and which the operation request directed to the member resource is an update request;
determining that a first operation request identifier for the operation request directed to the member resource needs to be generated;
generating the first operation request identifier for the operation request directed to the member resource; and
sending a first member resource operation request to a member device that the member resource belongs to, wherein the first member resource operation request comprises the first operation request identifier.

8. A group server, comprising:
a receiving module, configured to receive an operation request directed to a member resource, wherein, the member resource operation request carries a group resource identifier of a group resource that the member resource belongs to;
a determining module, configure to determine, according to the group resource identifier, at least one of which the group resource identified by the group resource identifier comprises a sub-group resource that is used as a member resource, which a member resource comprised in the group resource identified by the group resource identifier comprises the group resource identified by the group resource identifier, and which the operation request directed to the member resource is an update request, and configured to determine that the first operation request identifier for the operation request directed to the member resource needs to be generated;
a generating module, configured to generate a first operation request identifier for the member resource operation request; and
a sending module, configured to send a first member resource operation request to a member device that the member resource belongs to, wherein the first member resource operation request comprises the first operation request identifier, so that the member device that the member resource belongs to determines, according to the first operation request identifier, whether operation request identifiers stored by the member device comprise the first operation request identifier, and processes the first member resource operation request according to a determination result.

9. The group server according to claim 8, wherein:
the determining module is further configured to: determine the sub-group resource comprised in the group resource identified by the group resource identifier is a remote group resource.

10. The group server according to claim 8, wherein:
the receiving module is further configured to receive a second member resource operation request, wherein the second member resource operation request comprises a second operation request identifier; and the group server further comprises a judging module, configured to determine at least one of: of which a stored list of operation request identifiers comprises the second operation request identifier, and return an error response to a sender of the second member resource operation request, of which the stored list of operation request identifiers does not comprise the second operation request identifier, store the second operation request identifier, and perform an operation indicated in the second member resource operation requestor send a third member resource operation request to a member device that a member resource comprised in a sub-group resource identified by the sub-group resource identifier belongs to.

11. An apparatus for operating a group resource, comprising:
a receiving module, configured to receive a second member resource operation request;
a determining module, configured to determine that the member resource operation request carries a second operation request identifier; and
a judging module, configured to determine whether a stored list of operation request identifiers comprises the operation request identifier;
wherein, when the judging module determines that the stored list of operation request identifiers comprises the second operation request identifier, the judging module returns an error response to a sender of the second member resource operation request; and when the judging module determines that the stored list of operation request identifiers does not comprise the second operation request identifier, the judging module stores the second operation request identifier and processes the second member resource operation request.

12. The apparatus according to claim 11, wherein:
when the second member resource operation request further carries a sub-group resource identifier, the judging module processes the second member resource operation request comprises:
sending a third member resource operation request to a member device that a member resource comprised in a sub-group resource identified by the sub-group resource identifier belongs to; and
when the second member resource operation request does not carry a sub-group resource identifier, the judging module processes the second member resource operation request comprises:
performing an operation indicated in the second member resource operation request.

13. The apparatus according to claim 11, wherein:
the receiving module is further configured to receive an operation request directed to a member resource, and the operation request directed to a member resource carries a group resource identifier of a group resource that the member resource belongs to and the apparatus further comprises:
a determining module, configured to determine, according to the group resource identifier, at least one of which the group resource identified by the group resource identifier comprises a sub-group resource that is used as a member resource, which a member resource comprised in the group resource identified by the group resource identifier comprises the group resource identified by the group resource identifier, and which the operation request directed to the member resource is an update request; and the determining module is further configured to determine that a first operation request identifier for the operation request directed to the member resource needs to be generated;
a generating module, configured to generate the first operation request identifier for the operation request directed to the member resource; and
a sending module, configured to send a first member resource operation request to a member device that the member resource belongs to, wherein the first member resource operation request comprises the first operation request identifier.

* * * * *